United States Patent
Poitras

[19]

[11] Patent Number: 6,085,419
[45] Date of Patent: Jul. 11, 2000

[54] PARTS CARRIER BEARING ASSEMBLY REPAIR METHOD

[75] Inventor: Leo Poitras, Brampton, Canada

[73] Assignee: DaimlerChrysler Corporation, Auburn Hills, Mich.

[21] Appl. No.: 09/326,742

[22] Filed: Jun. 4, 1999

[51] Int. Cl.[7] .............................. B23P 15/12; B23P 6/00
[52] U.S. Cl. ................................ 29/898.01; 29/402.08; 29/402.03
[58] Field of Search ........................... 29/402.98, 402.03, 29/898.01, 898.07; 254/4 R, 47, 134, 100

[56] References Cited

U.S. PATENT DOCUMENTS

| | | |
|---|---|---|
| 170,301 | 11/1875 | Robison ................................. 254/134 |
| D. 252,555 | 8/1979 | Schreyer . |
| 472,835 | 4/1892 | Taylor . |
| 1,389,760 | 9/1921 | Humbert . |
| 3,329,404 | 7/1967 | Castoe . |
| 3,734,466 | 5/1973 | Mason ....................................... 254/89 |
| 3,851,854 | 12/1974 | Roybal ................................... 254/7 C |
| 4,336,921 | 6/1982 | Wienhold ............................... 254/8 B |
| 4,525,914 | 7/1985 | Bryan et al. . |

*Primary Examiner*—Rodney A. Butler
*Attorney, Agent, or Firm*—Lawrence J. Shurupoff

[57] ABSTRACT

A method of repairing a bearing assembly on a parts carrier having a frame suspended from an overhead track via the bearing assembly uses a flexible support tool having a pair of free ends and a length adjuster. The method includes looping the flexible support tool around the parts carrier frame and the overhead track and connecting the free ends of the flexible support tool together to form a closed loop around the parts carrier frame and the track. The method also includes tightening the closed loop around the parts carrier frame and the track with the length adjuster until the parts carrier frame is suspended from the overhead track by the closed loop. The bearing assembly is then removed from the frame.

4 Claims, 3 Drawing Sheets

PARTS CARRIER BEARING ASSEMBLY REPAIR METHOD

FIELD OF THE INVENTION

The present invention relates to methods of repairing a bearing assembly on a parts carrier. More specifically, the present invention relates to a method of repairing a bearing assembly of a parts carrier having an overhead track by utilizing a looped flexible support tool.

DESCRIPTION OF PRIOR DEVELOPMENTS

Automobiles have two major components, i.e., a body and a drive train. During the assembly of the vehicle, the major elements of the body are connected with the drive train and the remainder of the smaller vehicle components are then added on. A major portion of the vehicle body is typically fabricated from various sheet metal stampings which are welded together and manually or robotically loaded onto a parts carrier. The parts carrier delivers the vehicle body major portions to a storage area. Upon demand by an assembly operation, the vehicle body major portions are taken from the storage area by a parts carrier to another area of the assembly operation to form a complete vehicle body.

A parts carrier for the larger vehicle body portions typically has a frame with a somewhat vertically inclined front post which has a lower end connected to a transverse leg forming an inverted "T." A rear post which is generally vertical also has at its lower end a transversely projecting connected leg forming an inverted "T." The lower ends of the post are joined together by a longitudinally projecting lower beam. A top end of the posts are also joined to one another by a longitudinally projecting upper beam. The upper beam at opposite ends is connected with a prospective bearing assembly. The bearing assembly has a body which extends upwardly. The bearing body juxtaposes paired front and rear bearing members which are rotatably connected to the bearing body. The bearing members have an outer race which rolls in a track provided by two parallel spaced apart C-channels which face one another. The bearing members outer race rides on lower legs on the C-channels. The bearing assembly which is on a front end of the parts carrier is also connected with an overhead chain conveyor. Movement of the chain conveyor pulls the bearing assembly through the track and the frame of the parts carrier to the desired assembly location to deliver vehicle body major portions from storage to the desired assembly location. The chain conveyor is typically formed in a looped path wherein there the chain conveyor only moves in one selective direction.

The bearing members are the components of the parts carrier most subjected to wear. To replace the bearing members, the frame of the parts carrier typically has to be jacked upward to remove the weight of the bearings off of the lower legs of the C-channel track. This prior replacement procedure required a heavy duty jack and flooring or other rigid support underneath the frame of the vehicle carrier. Most vehicle assembly plants have certain areas which are multi-storied. The flooring underneath the parts carrier may often be a wire mesh screen. Therefore, in some locations there is no support underneath the parts carrier frame to jack up the frame to allow the bearing assembly to be removed. Prior to the present invention, when the bearing assembly required repair or removal while the parts carrier frame was in an area with no rigid flooring, a come along was used. The come along would have one end which would be connected with the parts carrier frame and a second end which would be placed on the overhead C-channel track. The come along was cumbersome, very heavy and awkward to handle in the manufacturing environment which often provided very little clearance.

It would be desirable to have a method to remove the bearing assembly to allow for repair on an automotive parts carrier without the use of an underfloor jack. It would also be desirable to provide a method of removal of the bearing assembly of a parts carrier without the use of a heavy come along.

SUMMARY OF THE INVENTION

To meet the above noted desires, the present invention provides a method of repairing the bearing assembly utilizing a flexible support tool. The flexible support tool is looped around the frame of the parts carrier and the overhead track. The flexible support tool has two free ends which are joined together to form a closed loop around the frame and track. A length adjuster is provided which tightens the flexible support tool about the frame and track until the frame is suspended from the track. The bearing members can then be easily removed for repair and/or replacement.

The above-noted features and other advantages of the present inventive method will become more apparent to those skilled in the art as the invention is further explained in the accompanying drawings and detailed description.

DETAILED DESCRIPTION OF THE DRAWINGS

Figure 1:
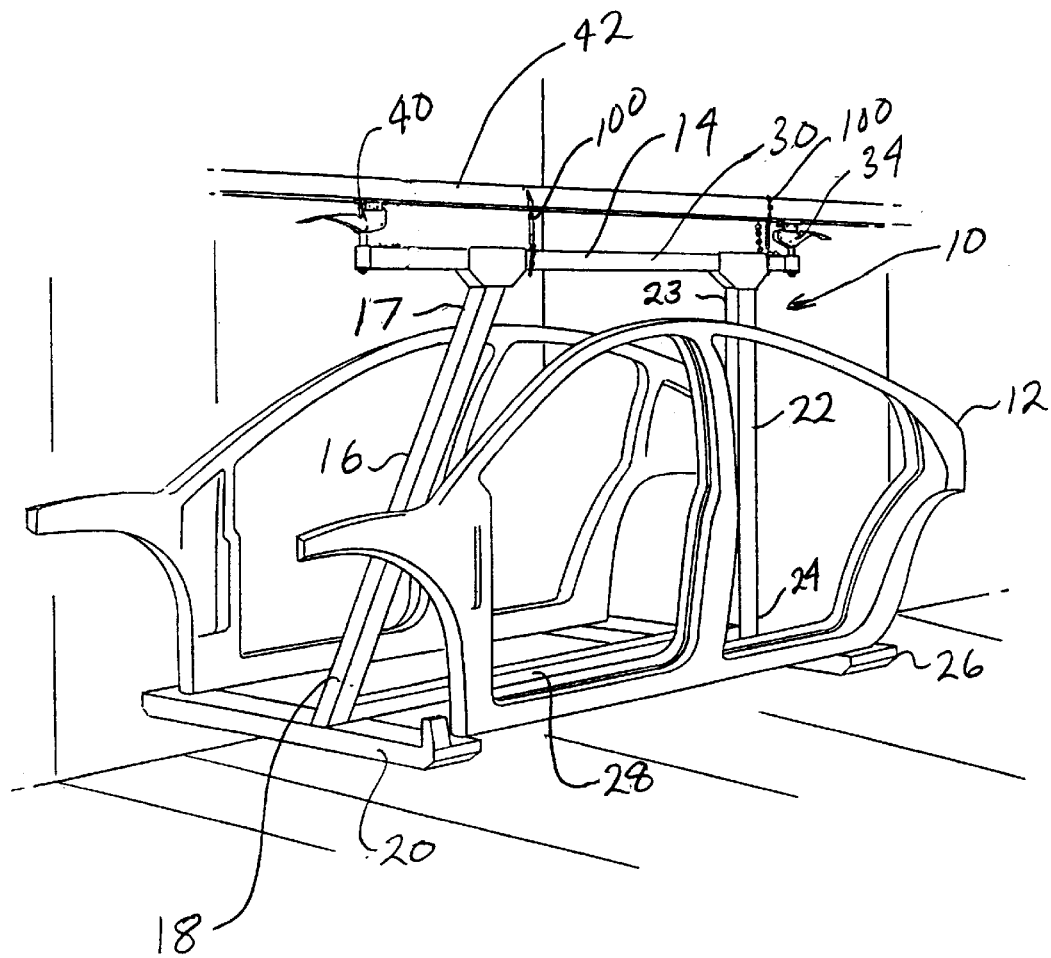
FIG. 1 is a perspective view of a parts carrier being utilized for carrying the side modules of an automotive body, with two flexible support tools being utilized in a method of repairing the bearing assembly according to the present invention.

FIG. 1 illustrates a parts carrier 10 transporting vehicle side body portions 12 of an automotive vehicle. The parts carrier 10 has a frame 14. The frame 14 has a vertically inclined front post 16 having an upper end 17 and a lower end 18. Welded to the front post lower end 18 is a front transversely projectioning leg 20. Leg 20 forms an inverted "T" with the front post 16. The parts carrier 10 has a rear post 22. The rear post 22 has an upper end 23 and a lower end 24. The lower end 24 of the rear post is welded joined to a transversely projecting rear leg 26.

The rear leg 26 and the rear post 22 form an inverted "T." The front post 16 and the rear post 22 are joined along their lower ends 18 and 24 by a longitudinally projecting lower beam 28. The front post 16 and the rear post 22 are joined along their upper ends 17 and 23 via an upper beam 30 to complete the frame 14 of the parts carrier. The upper beam 30 is pivotably connected with a rear bearing assembly 34. The upper beam 30 at its forward end is pivotally connected with a forward bearing assembly 40. The bearing assemblies 34 and 40 are suspended from an overhead track 42. A conveyor chain (not shown) is connected with the front bearing assembly 40 to pull the parts carrier 10 to its desired location to deliver the vehicle side body portions 12 to their fabrication point in the assembly plant. A robot (not shown) delivers the vehicle body side portions 12 to the parts carrier 10.

Figure 2:
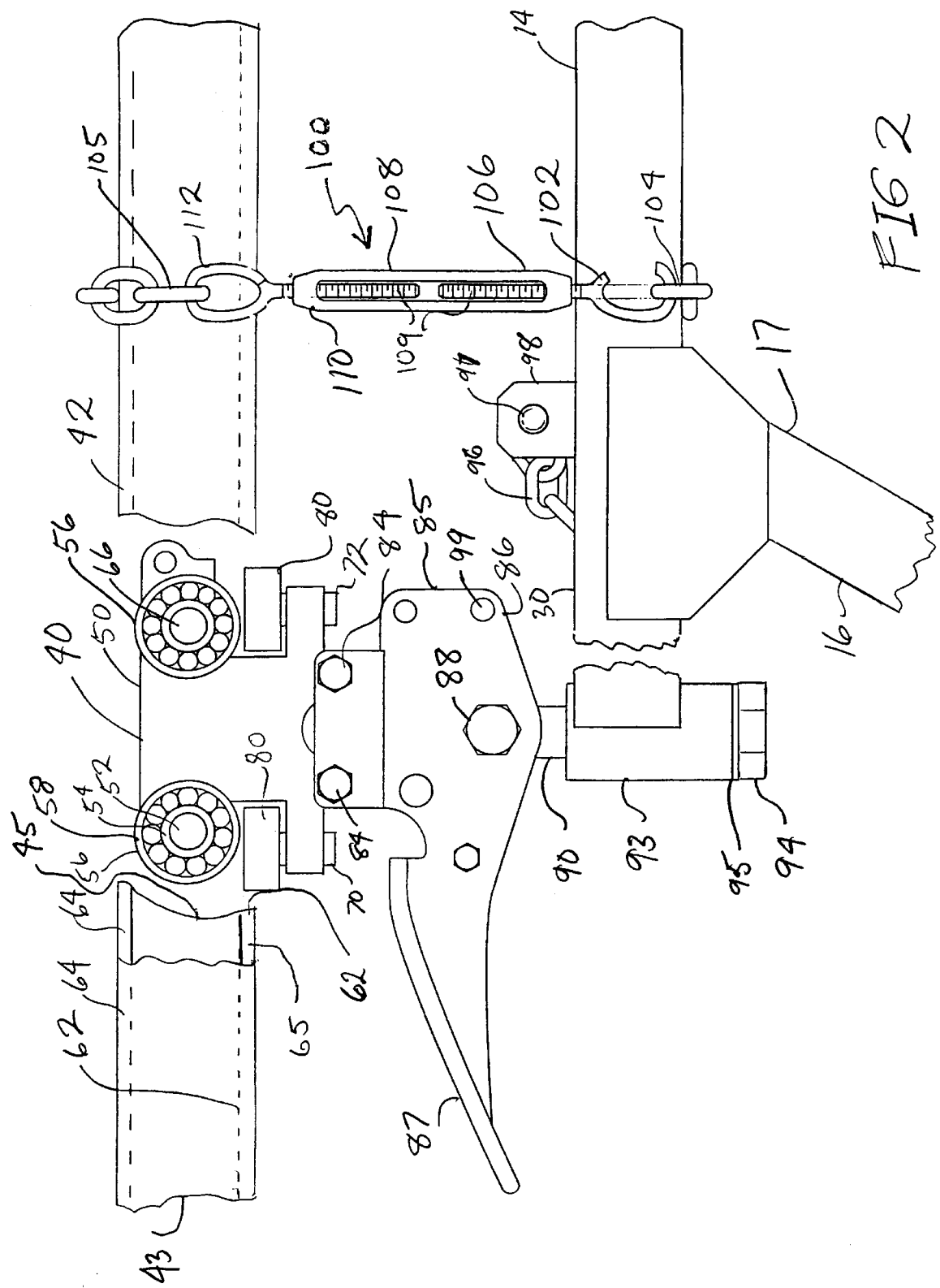
FIG. 2 is an enlarged side elevational view illustrating the connection between a post of the parts carrier frame and the bearing assembly.

Referring to FIG. 2, the front bearing assembly 40 has a bearing block 50. The bearing block 50 has a transversely fixably connected pin 52. Press fitted to the transverse pin 52 is an inner race 54 of a bearing 56. The bearing 56 has an outer race 58. The outer race 58 rolls on top of a lower leg 62 of the C-channel 43 which forms one side of the track 42. The C-channel has an upper leg 64 which projects horizontally generally parallel with the lower leg 62 to capture the bearing 58. The pin 52 extends on both sides of the bearing block 50. On a side of the bearing block 50 opposite that shown in FIG. 2 another front bearing 56 is joined to the pin 52. The opposite front bearing rides on the lower leg 62 of the opposing C-channel 45. In a similar manner the bearing block 50 has a rear transverse pin 66 which also mounts a pair of rear bearings 56 thereto. The rear bearings 56 also ride upon the lower leg 62 of the two C-channels 43 and 45. The C-channels 43 and 45 are laterally spaced from one another and provide a gap which exposes a vertical edge 65 of each of the lower legs. The bearing block 50 additionally has connected thereto a forward vertically projecting pin 70 and a rear vertically projecting pin 72. The pins 70 and 72 mount lateral bearing 80 which contact and roll along and between the lateral edges 65 of the C-channels for lateral stabilization of the bearing assembly 40.

Figure 4:
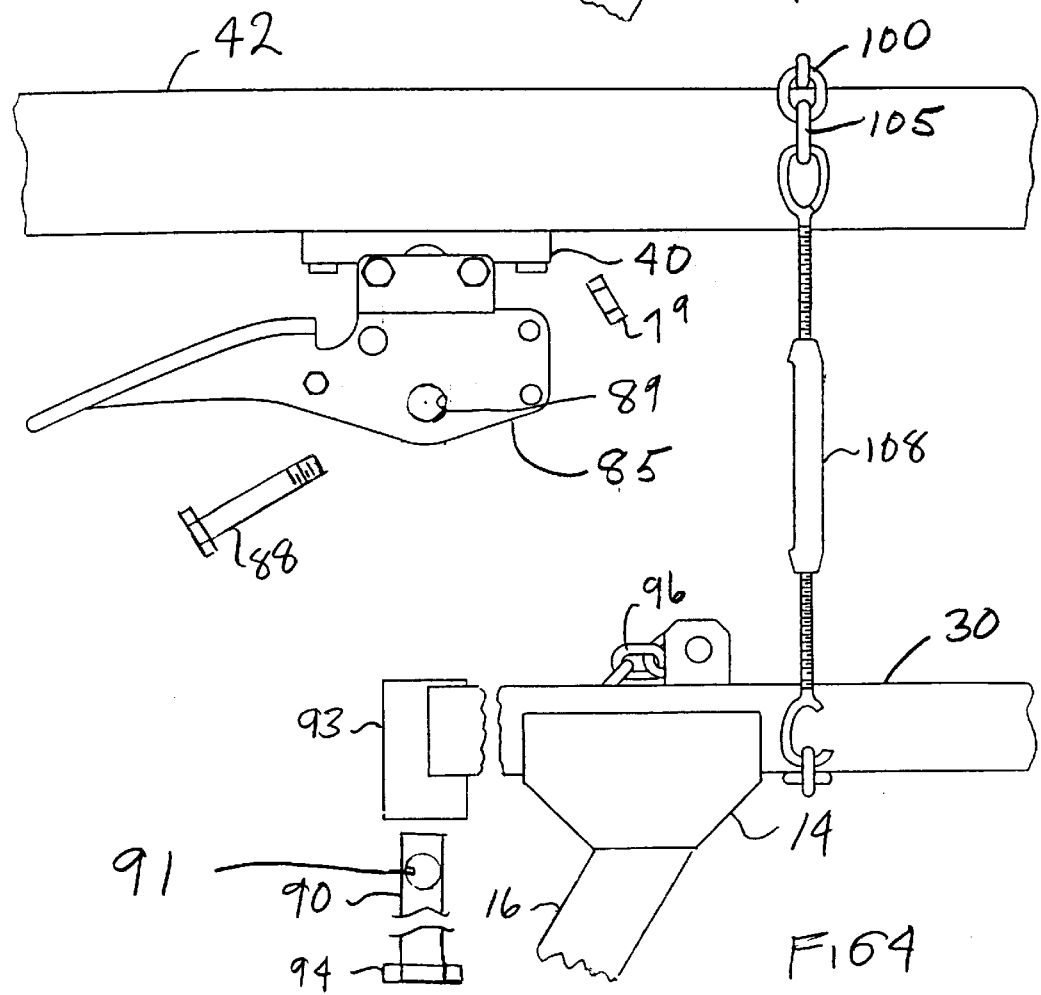

Connected by bolts 84 to the bearing block 50 is a beaver tail 85. The beaver tail 85 has two parallel spaced plates 86. The plates 86 are weldably connected with an incline surface 87. The incline surface 87 is utilized in disconnecting or connecting the bearing assembly 40 with the overhead chain conveyor (not shown) in a manner conventional for tow-type conveyor parts carriers and is not considered part of this invention. The plates 85 have a cross bore 89 (FIG. 4). Inserted within the cross bore 89 is a cross pin 88. A nut 79 threadably engages the end of the cross pin 88 to secure the cross pin 88 to the beaver tail 85. The beaver tail 85 is connected with the frame 14 of the parts carrier via a first pivot pin 90. The pivot pin 90 has a cross bore 91 which is aligned with the cross bore 89. The pin 88 is extended through the cross bores 91 and 89 to secure the first pin 90 to the beaver tail 85. The first pin 91 is pivotably mounted within a pivotal cylindrical mount 93 which is welded to the upper beam 30. The first pin 90 has a head 94 which abuts a thrust washer or bearing 95 (only shown in FIG. 2).

A safety chain 96 via a pin 97 is connected to a boss 98 which is welded to the upper beam 30. An opposite end of chain 96 (not shown) is connected with the beaver tail 85 via a cross pin 99 which extends between the two plates 86. The safety chain 96 is provided to prevent the frame 14 from falling down in case of failure of first pin 90. Up to this point, the description has been directed to a known parts carrier and conveyor system used in the manufacture of automobiles and trucks.

Figure 3:
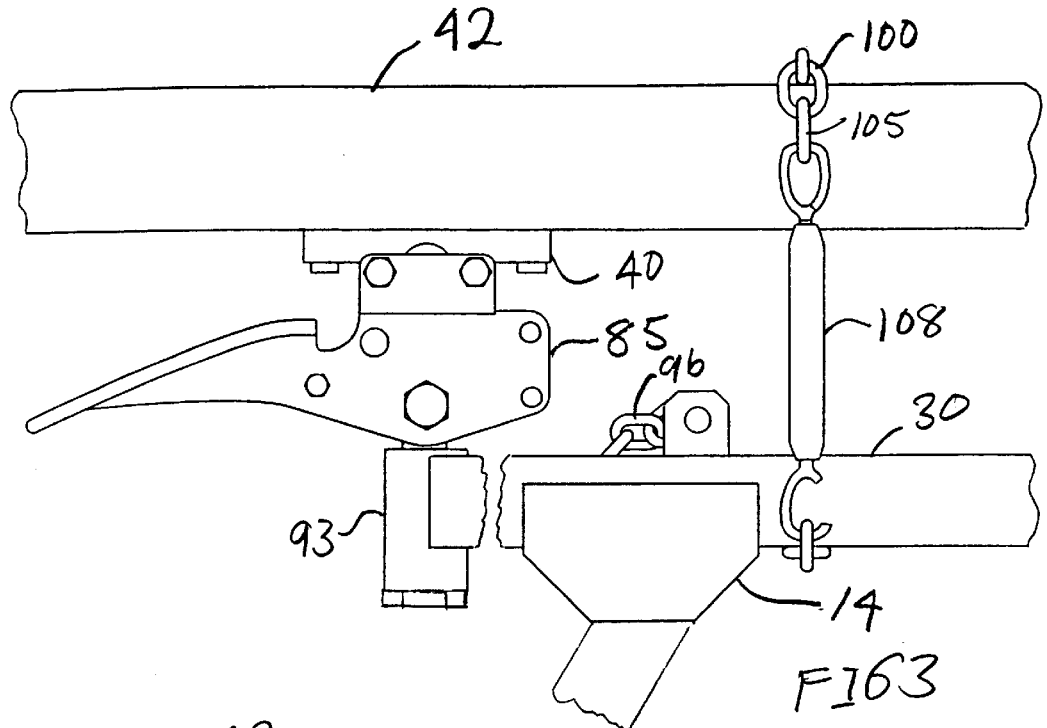
FIGS. 3 and 4 are side elevational views similar to that of FIG. 2 demonstrating the removal of the bearing assembly utilizing the flexible support tool.

To repair or replace the bearings 56, the weight of the frame 14 must first be removed from the bearing assembly 40. To accomplish this, a flexible support tool 100 is provided. The flexible support tool 100 has a first free end formed by a partially open eyelet or hook 102. A second free end is provided by a selected loop 104 of a chain 105. The flexible support tool 100 is looped around the frame 14 (via upper beam 30) and the track 42. The free ends 102 and 104 are connected so that the flexible support tool 100 forms a closed loop around the frame 14 and the track 42. The flexible support tool 100 has a length adjuster provided by a turn buckle 108. The turn buckle has a body 110. The body 110 is threadably connected to the threaded shafts 109 of eyelets 102 and 112. A turning of the body 110 of the turn buckle adjusts the length of the closed loop and tightens (or loosens) the flexible support tool 100. FIG. 2 illustrates the bearing assembly 40 in normal operation with the bearing assembly 40 being loaded by the weight of the frame 14. Referring to FIG. 3, the turn buckle 108 has been tightened therefore putting the load of the frame 14 upon the flexible support tool 100. With the vertical load taken up by tool 100, the pin 88 can thereafter be safely and easily removed, allowing removal of the pivot pin 90 and thereby allowing the bearing assembly 40 to be removed from the track. The removal of pins 88 and 90 is shown in FIG. 4.

Typically, the track 42 will have a section (not shown) allowing one of the C-channels to pivot outwardly to allow the easy removal of the bearing assembly 40 after it has been disconnected from the carrier frame 14. The flexible support tool 100 can then be elongated (FIG. 4) to allow for lubrication or other maintenance of the pivotal mount 93 if desired after the removal of the pivot pin 90. Once removed from the track 42, the bearings 56 and 58 can be easily removed from the bearing block 50, and after an installation of a new bearing or bearings 56, 58 the bearing assembly 40 will be reinstalled by a reverse of the operations herein described. Referring back to FIG. 1, a second flexible support tool 100 can be utilized to raise up the rearward end of the frame 14 to allow removal of both bearing assemblies 34 and 40 simultaneously if desired.

While a preferred embodiment of the present invention has been disclosed, it is to be understood that it has been described by way of example only and that various modifications can be made without departing from the spirit and scope of the invention as it is encompassed in the following claims.

I claim:

1. A method of repairing a bearing assembly on a parts carrier having a frame suspended from an overhead track via said bearing assembly using a flexible support tool having a pair of free ends and a length adjuster without providing any support of said parts carrier from underneath said parts carrier and wherein said method comprises:

looping said flexible support tool around said frame and said track and connecting said free ends of said flexible support tool together to form a closed loop around said frame and said track;

tightening said closed loop around said frame and said tracks with said length adjuster until said frame is suspended from said track by said loop; and removing said bearing assembly from said frame.

2. A method as described in claim 1 further including looping a second flexible support tool around said frame and said track and connecting said free end portions of said second flexible support tool together to form a closed loop around said frame and said track and tightening said second closed loop around said frame and said track with said length adjuster until said frame is suspended from said track by said closed loop.

3. A method as described in claim 1 wherein said flexible support tool has eyelets threadably connected with a body and said tightening of said closed loop is accomplished by rotation of said body.

4. A method as described in claim 1 wherein said frame is connected to said bearing assembly by a first pin pivotably mounted with respect to said frame and a second pin connecting said first pin with said bearing assembly and said bearing assembly is removed from said frame by removing said first and second pins.

* * * * *